(12) United States Patent
Takeyama et al.

(10) Patent No.: US 12,107,536 B2
(45) Date of Patent: Oct. 1, 2024

(54) SOLAR POWER GENERATION SYSTEM

(71) Applicant: OMRON Corporation, Kyoto (JP)

(72) Inventors: Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/107,010

(22) Filed: Feb. 8, 2023

(65) Prior Publication Data

US 2023/0268876 A1  Aug. 24, 2023

(30) Foreign Application Priority Data

Feb. 22, 2022  (JP) .................................. 2022-026171

(51) Int. Cl.
| | |
|---|---|
| H02S 40/36 | (2014.01) |
| H02H 7/20 | (2006.01) |
| H02S 40/32 | (2014.01) |
| H02S 50/00 | (2014.01) |

(52) U.S. Cl.
CPC ............... *H02S 40/36* (2014.12); *H02H 7/20* (2013.01); *H02S 40/32* (2014.12); *H02S 50/00* (2013.01)

(58) Field of Classification Search
CPC .......... H02S 40/36; H02S 40/32; H02S 50/00; H02S 40/30; H02H 7/20; H02H 3/05
See application file for complete search history.

(56) References Cited

U.S. PATENT DOCUMENTS

| | | | |
|---|---|---|---|
| 2017/0271875 A1* | 9/2017 | Narla | ...................... H02S 40/38 |
| 2019/0027617 A1* | 1/2019 | Varlan | ..................... H02S 50/10 |
| 2021/0281065 A1* | 9/2021 | Zhu | ........................ H02S 40/32 |

FOREIGN PATENT DOCUMENTS

| | | |
|---|---|---|
| JP | 2012-511299 A | 5/2012 |
| WO | 2010/065043 A1 | 6/2010 |

* cited by examiner

*Primary Examiner* — Michael Y Sun
(74) *Attorney, Agent, or Firm* — SHINJYU GLOBAL IP

(57) ABSTRACT

A solar power generation system includes a string, an inverter, a first shutoff device, and a second shutoff device. The string includes a plurality of solar cell modules connected in series. The first shutoff device turns OFF, in response to a first control signal from the inverter, a first switching unit and a second switching unit. The first switching unit is connected to an anode side terminal of the string and an anode side terminal of the inverter. The second switching unit is connected to a cathode side terminal of the string and a cathode side terminal of the inverter. The second shutoff device is configured to output a second state signal to the first shutoff device and cut off a solar cell module group and either another solar cell module or the inverter, in response to a second control signal from the first shutoff device.

16 Claims, 8 Drawing Sheets

| OPERATION MODE | | WEATHER SUNLIGHT | POWER GENERATION | FIRST CONTROL SIGNAL | RELAY OPERATION MODE |
|---|---|---|---|---|---|
| START | | ☀ | YES | NO | ON |
| ACTIVE | | ☀ | YES | NO | ON |
| SAFETY | | ☽ 🌧 | NO | YES | OFF |
| | NORMAL CUTOFF | ⛅ | UNSTABLE | NO | ON |
| EMERGENCY SAFETY CUTOFF | | ☀ | YES | YES | OFF |

FIG. 5

| OPERATION MODE | | WEATHER SUNLIGHT | POWER GENERATION | SECOND CONTROL SIGNAL | RELAY OPERATION MODE |
|---|---|---|---|---|---|
| START | | ☀ | YES | NO | ON |
| ACTIVE | | ☀ | YES | NO | ON |
| SAFETY | NORMAL CUTOFF | ☾ 🌧 | NO | YES | OFF |
| | | ⛅ | UNSTABLE | NO | ON/OFF |
| | EMERGENCY SAFETY CUTOFF | ☀ | YES | YES | OFF |

FIG. 6

SOLAR POWER GENERATION SYSTEM

CROSS-REFERENCE TO RELATED APPLICATION

This application claims priority to Japanese Patent Application No. 2022-026171, filed Feb. 22, 2022. The contents of that application are incorporated by reference herein in their entirety.

FIELD

The present invention relates to a solar power generation system.

BACKGROUND

Some solar power generation systems are equipped with a function that is configured to immediately stop the power generation in an emergency, for the purpose of protecting firefighters from electric shock in an emergency such as a fire (for example, see Published Japanese Translation No. 2012-511299 of the PCT International Publication). The function is called rapid shutdown function, which is executed by a shutoff device configured to cut off the electric path of the solar power generation system in response to a control signal generated in an emergency.

SUMMARY

In a solar power generation system, a shutoff device is connected to an electric path for an anode side terminal of a group including one or a plurality of series-connected solar cell modules and an electric path for a cathode side terminal of the group. However, the conventional shutoff device is configured to cut off one of the two electric paths. Such configuration leaves an issue related to safety in an emergency.

An object of the present invention is to improve the safety of a solar power generation system.

A solar power generation system according to one aspect of the present invention includes a string, an inverter, a first shutoff device, and a second shutoff device. The string includes a plurality of solar cell modules connected in series. The inverter is connected to the string and configured to convert DC power output from the string to AC power. The first shutoff device includes a first switching unit connected to an anode side terminal of the string and an anode side terminal of the inverter, and a second switching unit connected to a cathode side terminal of the string and a cathode side terminal of the inverter. The first shutoff device is configured to turn OFF the first switching unit and the second switching unit in response to a first control signal from the inverter. The second shutoff device is connected to an electric path connecting a solar cell module group and either another solar cell module or the inverter. The solar cell module group includes one or a plurality of solar cell modules connected in series in the string. The second shutoff device is configured to cut off the solar cell module group and either the another solar cell module or the inverter in response to a second control signal from the first shutoff device and output a second state signal to the inverter or the first shutoff device in response to a second control signal from the first shutoff device.

In the solar power generation system, the first shutoff device includes a first switching unit connected to an anode side terminal of the string and an anode side terminal of the inverter, and a second switching unit connected to a cathode side terminal of the string and a cathode side terminal of the inverter, and turns OFF the first switching unit and the second switching unit in response to a first control signal from the inverter. That is, the first shutoff device is configured to cut off, in response to a first control signal from the inverter, both the electric path connecting the anode side terminal of the string and the anode side terminal of the inverter and the electric path connecting the cathode side terminal of the string and the cathode side terminal of the inverter. The configuration enables the cutoff of both of the two electric paths connecting the string and the inverter, assuring reliable electrical cutoff of the string and the inverter. As a result, it is possible to improve the safety of the solar power generation system in an emergency. Further, the first shutoff device or the inverter can monitor whether the second shutoff device is operating normally.

When the inverter or the first shutoff device determines that the second shutoff device is abnormal depending on the second state signal output from the second shutoff device, the inverter or the first shutoff device may output an abnormal signal. In this case, the inverter or the first shutoff device can notify the user or the like of an abnormality in the second shutoff device.

The second shutoff device may output the second state signal to the inverter or the first shutoff device by power line communication.

The second shutoff device may output the second state signal to the inverter or the first shutoff device by wireless communication.

The second shutoff device may include an open-close unit configured to open and close a connection between the solar cell module group and the another solar cell module. The second state signal output from the second shutoff device may include information about an opened or closed state of the open-close unit. In this case, for example, the inverter or the first shutoff device can monitor whether the open-close unit is operating normally.

The inverter may be configured to monitor the first shutoff device based on a first state signal output from the first shutoff device. In this case, the inverter can monitor whether the first shutoff device is operating normally.

When the inverter determines that the first shutoff device is abnormal depending on the first state signal, the inverter may output an abnormal signal. In this case, the inverter can notify the user or the like of an abnormality in the first shutoff device.

The second shutoff device may include a third switching unit connected to an electric path connecting an anode side terminal of the solar cell module group and either the another solar cell module or the inverter and a fourth switching unit connected to an electric path connecting a cathode side terminal of the solar cell module group and either the another solar cell module or the inverter. In this case, the second shutoff device is able to cut off both of an electric path connecting an anode side terminal of the solar cell module group and either the another solar cell module or the inverter (hereinafter referred to as "the other device") and the electric path connecting a cathode side terminal of the solar cell module group and the other device. As a result, it is possible to improve the safety of the solar power generation system in an emergency.

The second shutoff device may include a bypass device connected in parallel with the solar cell module group and configured to form an electric path bypassing the solar cell module group. In this case, when an abnormality occurs in the solar cell module group, it is possible for the power generated by the another solar cell module to bypass the bypass device to be supplied to the inverter.

The bypass device may be a diode having an anode connected to the cathode side terminal of a solar cell module group and a cathode connected to the anode side terminal of the solar cell module group. In this case, when an abnormality occurs in the solar cell module group, an electric path bypassing said solar cell module group can be immediately formed without any instruction by an external signal.

The first shutoff device may be driven by power supplied from a commercial power supply. In this case, the first shutoff device is able to operate whether or not power is supplied thereto from the string. As a result, the string and the inverter can be reliably cut off in an emergency, and thereby the safety of the solar power generation system in an emergency can be improved.

The second shutoff device may be driven by power generated by at least one of the plurality of solar cell modules. In this case, the power generated by the solar cell modules can be used effectively to drive the second shutoff device.

The inverter may output the first control signal to the first shutoff device by power line communication. In this case, no separate wiring for communication between the inverter and the first shutoff device is necessary.

The inverter may output the first control signal to the first shutoff device by wireless communication. In this case, no wiring for communication between the inverter and the first shutoff device is necessary.

The first shutoff device may output the second control signal to the second shutoff device by power line communication, upon receipt of the first control signal from the inverter. In this case, no separate wiring for communication between the first shutoff device and the second shutoff device is necessary.

The first shutoff device may output the second control signal to the second shutoff device by wireless communication, upon receipt of the first control signal from the inverter. In this case, no wiring for communication between the first shutoff device and the second shutoff device is necessary.

BRIEF DESCRIPTION OF THE DRAWINGS

FIG. 5 is a diagram showing a state of a first shutoff device in each operation mode.

FIG. 6 is a diagram showing a state of a second shutoff device in each operation mode.

DETAILED DESCRIPTION

Figure 1:
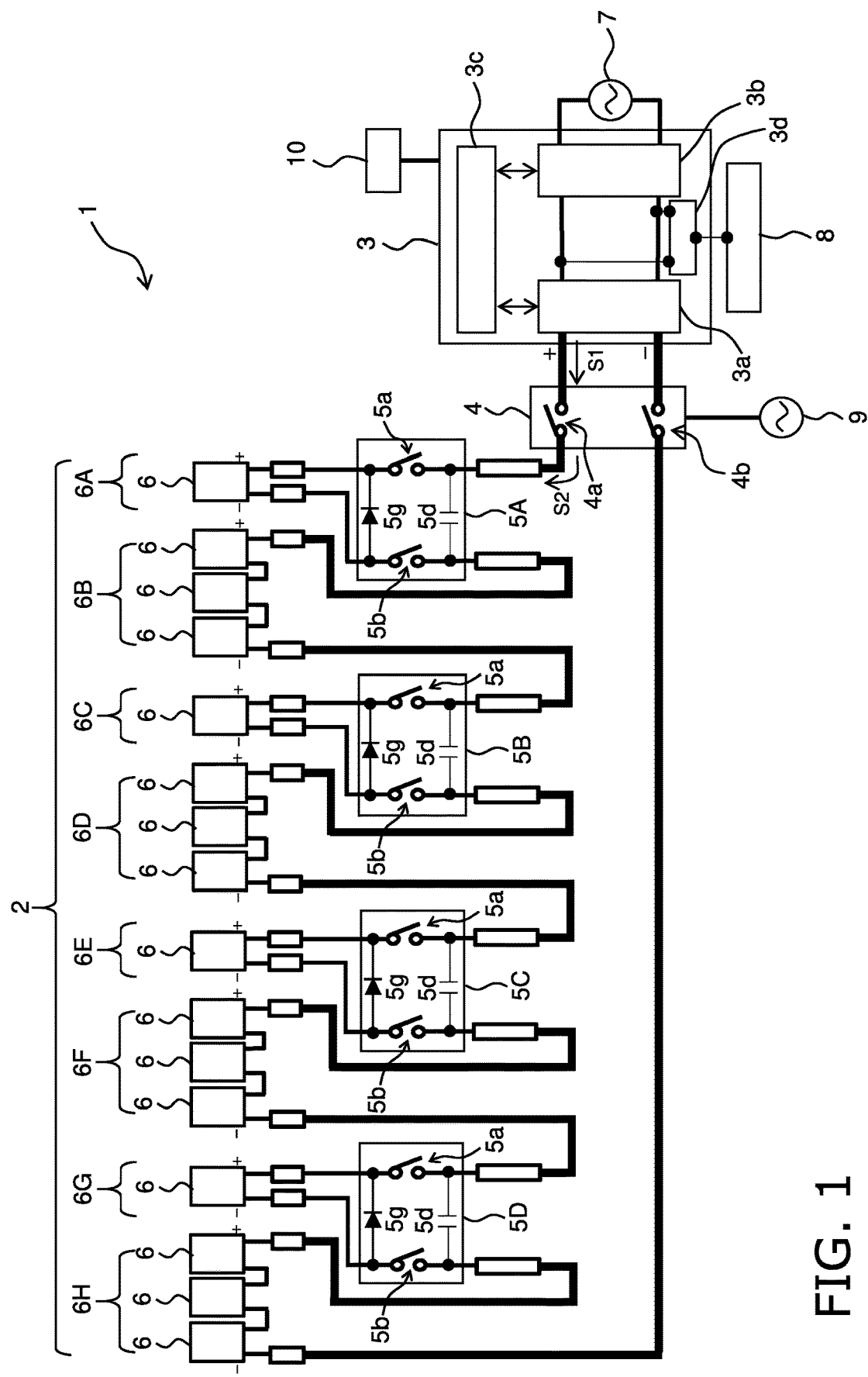
FIG. 1 is a diagram showing a configuration of a solar power generation system.

A solar power generation system 1 is described with reference to FIG. 1. FIG. 1 is a diagram showing a configuration of the solar power generation system 1. The solar power generation system 1 includes a string 2, an inverter 3, a first shutoff device 4, and second shutoff devices 5A to 5D.

The string 2 includes a plurality of solar cell modules 6 connected in series. The string 2 of the present embodiment includes 16 solar cell modules 6. It should be noted that the solar power generation system 1 may include a solar cell array in which a plurality of strings 2 are connected in parallel.

The string 2 includes a plurality of solar cell module groups. Each of the plurality of solar cell module groups includes one or a plurality of a plurality of series-connected solar cell modules 6. The solar cell module group each have an anode side terminal and a cathode side terminal. In a group consisted of one solar cell module 6, the anode of the solar cell module 6 provides the anode side terminal of said group, and the cathode of the solar cell module 6 provides the cathode side terminal of said group.

In a group including a plurality of solar cell modules 6, among the plurality of series-connected solar cell modules 6, the anode side terminal of said group is configured by the anode of the solar cell module 6 closest to the anode of the inverter 3, and the cathode side terminal of said group is configured by the cathode of the solar cell module 6 closest to the cathode of the inverter 3. In FIG. 1, the anode side terminal of each solar cell module group is indicated by "+", and the cathode side terminal is indicated by "−".

The string 2 includes eight solar cell module groups in total: a first solar cell module group 6A to an eighth solar cell module group 6H. The first group 6A, the third group 6C, the fifth group 6E, and the seventh group 6G each include one solar cell module 6. The second group 6B, the fourth group 6D, the sixth group 6F, and the eighth group 6H each include three solar cell modules 6.

The first group 6A to the eighth group 6H are connected in series in the string 2. Specifically, the cathode side terminal of the first group 6A is connected to the anode side terminal of the second group 6B. The cathode side terminal of the second group 6B is connected to the anode side terminal of the third group 6C. The cathode side terminal of the third group 6C is connected to the anode side terminal of the fourth group 6D. The cathode side terminal of the fourth group 6D is connected to the anode side terminal of the fifth group 6E. The cathode side terminal of the fifth group 6E is connected to the anode side terminal of the sixth group 6F. The cathode side terminal of the sixth group 6F is connected to the anode side terminal of the seventh group 6G. The cathode side terminal of the seventh group 6G is connected to the anode side terminal of the eighth group 6H. It should be noted that the anode side terminal of the first group 6A is connected to the anode side terminal of the inverter 3. The cathode side terminal of the eighth group 6H is connected to the cathode side terminal of the inverter 3.

The solar cell modules 6 receive sunlight and generate power. The solar cell modules 6 have an open circuit voltage of 50 V, for example. The inverter 3 is connected to the string 2 via a power line. The inverter 3 converts DC power output from the string 2 in which the plurality of solar cell modules 6 are connected in series into AC power. The inverter 3 is connected to a power system 7 and supplies the AC power to commercial power systems and load devices.

Specifically, the inverter 3 includes a DC/DC converter 3a, a DC/AC inverter 3b, a control unit 3c, and a first control signal generating unit 3d. The DC/DC converter 3a converts the voltage of the power output from the string 2 into a predetermined voltage and inputs it to the DC/AC inverter 3b. The DC/AC inverter 3b converts the DC power output from the DC/DC converter 3a into AC power.

The control unit 3c is a computer system including a CPU, memory, and various interface. The control unit 3c controls the DC/DC converter 3a and the DC/AC inverter 3b. The control unit 3c may control the DC/DC converter 3a and the DC/AC inverter 3b by executing a program stored in a storage device. The first control signal generating unit 3d outputs a first control signal S1 to the first shutoff device 4 by power line communication when an operation switch 8 is pressed.

The first shutoff device 4 is connected to a power line connecting between the string 2 and the inverter 3. The first shutoff device 4 cuts off the string 2 and the inverter 3 in response to the first control signal S1 from the inverter 3.

The second shutoff devices 5A to 5D are each connected to an electric path connecting one solar cell module group and another solar cell module, or an electric path connecting one solar cell module group and the inverter 3.

Specifically, the second shutoff device 5A is connected to an electric path connecting the anode side terminal of the first group 6A and the first shutoff device 4, and also to an electric path connecting the cathode side terminal of the first group 6A and the anode side terminal of the second group 6B. The second shutoff device 5B is connected to an electric path connecting the anode side terminals of the third group 6C and the cathode side terminals of the second group 6B, and also to an electric path connecting the cathode side terminals of the third group 6C and the anode side terminal of the fourth group 6D. The second shutoff device 5C is connected to an electric path connecting the anode side terminals of the fifth group 6E and the cathode side terminals of the fourth group 6D, and also to an electric path connecting the cathode side terminals of the fifth group 6E and the anode side terminal of the sixth group 6F. The second shutoff device 5D is connected to an electric path connecting the anode side terminals of the seventh group 6G and the cathode side terminals of the sixth group 6F, and also to an electric path connecting the cathode side terminals of the seventh group 6G and the anode side terminal of the eighth group 6H.

In response to the second control signal S2 from the first shutoff device 4, each of the second shutoff devices 5A to 5D cuts off the solar cell module group to which the device itself is connected and the other solar cell modules, or cuts off the solar cell module group to which the device itself is connected and the inverter 3. In response to the second control signal S2 from the first shutoff device 4, each of the second shutoff devices 5A to 5D outputs a second state signal to the first shutoff device.

Figure 2:
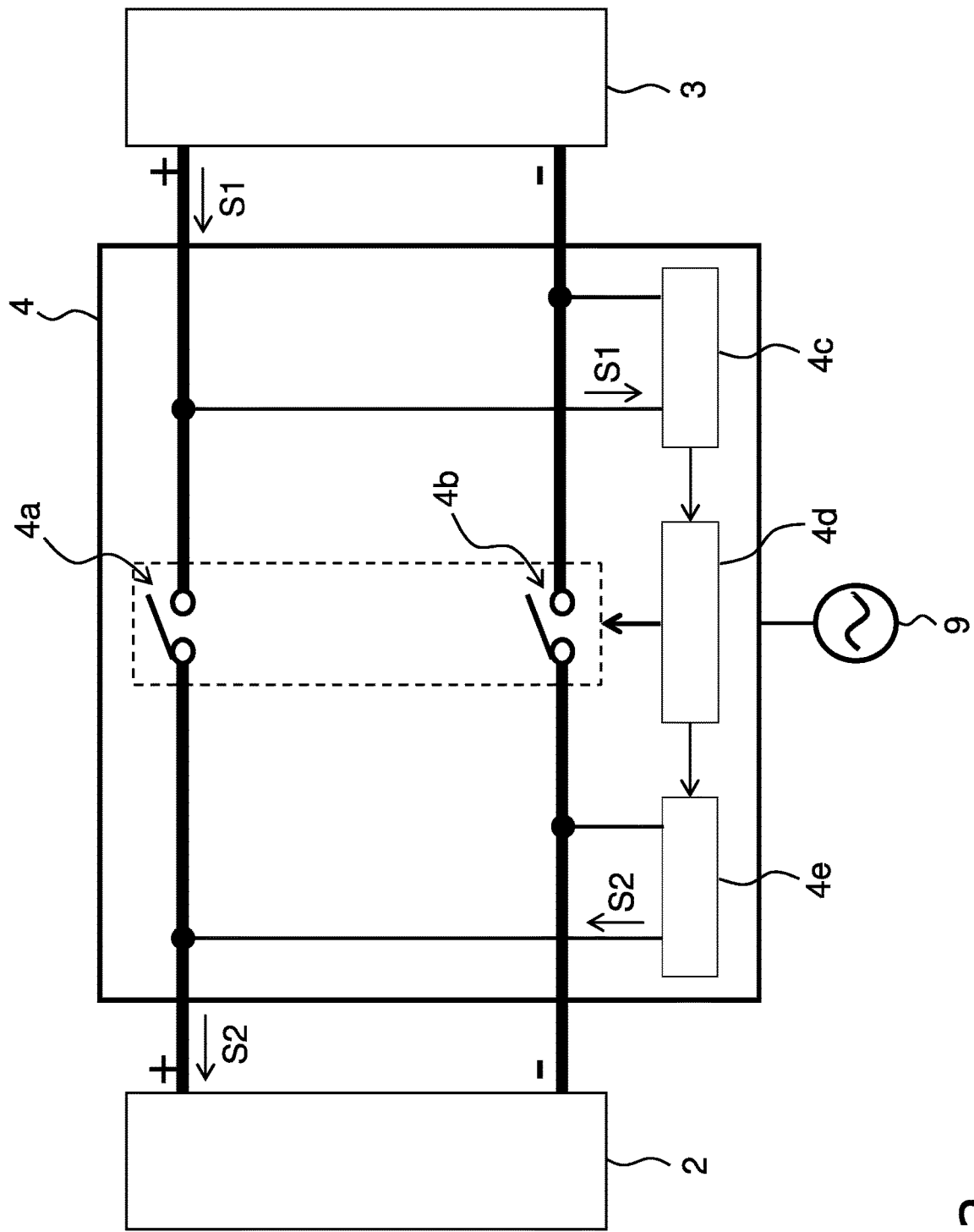
FIG. 2 is a diagram showing a configuration of a first shutoff device.

A specific configuration of the first shutoff device 4 will be described below with reference to FIG. 2. FIG. 2 is a diagram showing a configuration of the first shutoff device 4. The first shutoff device 4 includes a first switching unit 4a, a second switching unit 4b, a first signal receiving unit 4c, a first driving unit 4d, and a first signal sending unit 4e.

The first switching unit 4a has one end connected to the anode side terminal of the string 2 and the other end connected to the anode side terminal of the inverter. The anode side terminal of the string 2 corresponds to the anode of the solar cell module 6 in the first group 6A. The second switching unit 4b has one end connected to the cathode side terminal of the string 2 and the other end connected to the cathode side terminal of the inverter. The cathode side terminal of the string 2 corresponds to the cathode of the solar cell module 6, among the solar cell modules 6 in the eighth group 6H, closest to the cathode side terminal of the inverter 3. The first switching unit 4a and the second switching unit 4b are switching devices, for example, relays or semiconductor switches such as MOSFETs.

In the present embodiment, the first switching unit 4a and the second switching unit 4b are simultaneously switched between the ON state and the OFF state under the control of the first driving unit 4d. As a result, it is possible to simultaneously cut off the power line connecting the anode side terminal of the string 2 and the anode side terminal of the inverter 3 and the power line connecting the cathode side terminal of the string 2 and the cathode side terminal of the inverter 3.

It should be noted that "turn the switching unit ON" means that the switching unit is made conductive to make the power line or the electric path, to which the switching unit is connected, electrically conductive. In contrast, "turn the switching unit OFF" means that the switching unit is made insulated to make the power line or electric path, to which the switching unit is connected, electrically cut off.

In addition, the first switching unit 4a and the second switching unit 4b may be independently supplied with a drive signal from the first driving unit 4d to be switched between the ON state and the OFF state independently of each other. Accordingly, the types of cutoff combinations can be increased using the power line connecting the anode side terminal of the string 2 and the anode side terminal of the inverter 3 and the power line connecting the cathode side terminal of the string 2 and the cathode side terminal of the inverter 3. For example, both of the above two power lines can be cut off, and one of the two power lines can be cut off as well. As a result, even if one of the switching units does not operate properly, the string 2 and the inverter 3 can be reliably cut off by cutting off one power line by another switching unit.

The first signal receiving unit 4c receives a first control signal S1 output from the inverter 3. Upon receiving the first control signal S1, the first signal receiving unit 4c outputs, to the first driving unit 4d, a signal indicating that the first control signal S1 has been received. In the present embodiment, the first control signal S1 is output by power line communication to the power line connecting the inverter 3 and the first shutoff device 4. Thus, the first signal receiving unit 4c is, for example, a signal receiving circuit configured to extract a signal sent by power line communication from the power line.

The first driving unit 4d outputs a drive signal for driving the first switching unit 4a and the second switching unit 4b, to the first switching unit 4a and the second switching unit 4b. When the string 2 is connected to the inverter 3, the first driving unit 4d outputs a drive signal for closing and turning ON the first switching unit 4a and the second switching unit 4b, to the first switching unit 4a and the second switching unit 4b. In contrast, upon receiving a signal indicating that the first control signal S1 has been received from the first signal receiving unit 4c, the first driving unit 4d stops outputting the drive signal, and opens and turns OFF the first switching unit 4a and the second switching unit 4b. With the configuration, the first switching unit 4a and the second switching unit 4b are able to cut off the string 2 and the inverter 3 in response to the first control signal S1.

On the contrary to the above configuration, the first switching unit 4a and the second switching unit 4b may be turned OFF upon receipt of a drive signal from the first driving unit 4d. In this case, the first driving unit 4d outputs a drive signal when receiving from the first signal receiving unit 4c a signal indicating that the first control signal S1 has been received, and turns OFF the first switching unit 4a and the second switching unit 4b. When not receiving the signal indicating that the first control signal S1 has been received, the first driving unit 4d stops outputting the drive signal, and turns ON the first switching unit 4a and the second switching unit 4b.

The first driving unit 4d is, for example, a signal generating circuit configured to generate a signal for driving the first switching unit 4a and the second switching unit 4b upon receipt of a signal from the first signal receiving unit 4c.

When cutting off the string 2 and the inverter 3 in response to the first control signal S1, the first driving unit 4d outputs, to the first signal sending unit 4e, a signal indicating that the string 2 and the inverter 3 have been cut off. The first signal sending unit 4e, when receiving the signal indicating that the string 2 and the inverter 3 have been cut off, outputs a second control signal S2 to the power line connecting the first shutoff device 4 and the string 2. In the present embodiment, the first signal sending unit 4e outputs the second control signal S2 to the power line connecting the first shutoff device 4 and the string 2 by power line communication. Thus, the first signal sending unit 4e is, for example, a signal generating circuit configured to generate and output a signal to be sent by power line communication.

The first shutoff device 4 is driven by an external commercial power supply 9. Specifically, the first driving unit 4d uses AC power supplied from the commercial power supply 9 to generate a signal for driving the first switching unit 4a and the second switching unit 4b. For example, the first driving unit 4d converts the AC power from the commercial power supply 9 into DC power to generate drive power. The first signal receiving unit 4c and the first signal sending unit 4e are also driven by the AC power supplied from the commercial power supply 9. These configurations allow the first shutoff device 4 to operate regardless of whether power is supplied from the string 2 or not.

Figure 3:
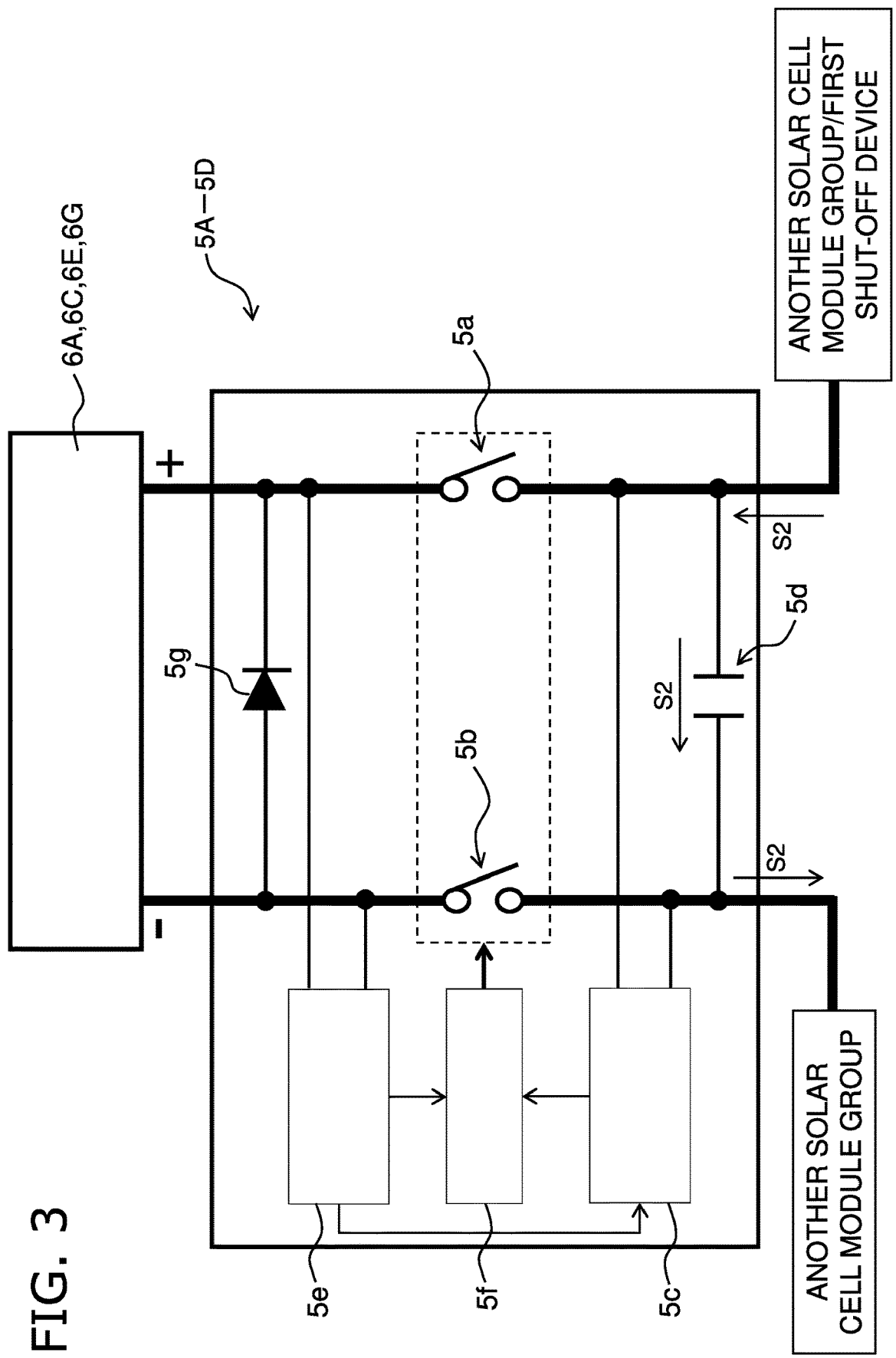
FIG. 3 is a diagram showing a configuration of a second shutoff device.

A specific configuration of the second shutoff devices 5A to 5D will be described below with reference to FIG. 3. FIG. 3 is a diagram showing a configuration of the second shutoff devices 5A to 5D. The second shutoff devices 5A to 5D have an identical configuration. Thus, the configuration of the second shutoff device 5A will be described in the following as an example. The second shutoff device 5A includes a third switching unit 5a, a fourth switching unit 5b, a second signal receiving unit 5c, a bypass circuit 5d, a power supply unit 5e, a second driving unit 5f, and a bypass device 5g.

The third switching unit 5a has one end connected to the anode side terminal of the first group 6A and the other end connected to the first shutoff device 4. The fourth switching unit 5b has one end connected to the cathode side terminal of the first group 6A and the other end connected to the anode side terminal of the second group 6B. The third switching unit 5a and the fourth switching unit 5b are switching devices, such as relays or semiconductor switches such as MOSFETs. The fourth switching unit 5b in the present embodiment is an example of an open-close unit.

In the present embodiment, the third switching unit 5a and the fourth switching unit 5b are simultaneously switched between the ON state and the OFF state under the control of the second driving unit 5f. With the configuration, the second shutoff device 5A is able to simultaneously cut off the electric path connecting the anode side terminal of the first group 6A and the first shutoff device 4 and the electric path connecting the cathode side terminal of the first group 6A and the anode side terminal of the second group 6B.

In addition, the third switching unit 5a and the fourth switching unit 5b may be independently supplied with the drive signal from the second driving unit 5f to be switched between the ON state and the OFF state independently of each other. With the configuration, the second shutoff device 5A is able to increase the types of cutoff combinations using the electric path connecting the anode side terminal of the first group 6A and the first shutoff device 4 and the electric path connecting the cathode side terminal of the first group 6A and the anode side terminal of the second group 6B. For example, both of the above two electric paths can be cut off, and only one of the two electric paths can be cut off as well. As a result, even if one of the switching units does not operate properly, the first group 6A and the other device can be cut off by cutting off one electric path by another switching unit.

The second signal receiving unit 5c receives the second control signal S2 output from the first shutoff device 4. The second signal receiving unit 5c, when receiving the second control signal S2, outputs to the second driving unit 5f a signal indicating that the second control signal S2 has been received. In the present embodiment, the second control signal S2 is output, by power line communication, to the electric path connecting the first shutoff device 4 and the second shutoff device 5A. Thus, the second signal receiving unit 5c is, for example, a signal receiving circuit configured to extract a signal sent by power line communication from an electric path.

The bypass circuit 5d is a circuit that is configured to transmit the second control signal S2 sent via one electric path to the other electric path in the second shutoff device 5A. Specifically, the bypass circuit 5d transmits the second control signal S2 sent via the electric path, to which the first shutoff device 4 is connected, to the electric path connecting the cathode side terminal of the first group 6A and the anode side terminal of the second group 6B.

In the present embodiment, the second control signal S2 is transmitted through the electric paths by power line communication. That is, the second control signal S2 is a signal of a predetermined frequency. Accordingly, the bypass circuit 5d is a circuit configured to pass signals of a predetermined frequency. Specifically, the bypass circuit 5d is, for example, a high-pass filter circuit configured to pass signals of frequencies equal to or higher than the predetermined frequency, or a band-pass filter circuit configured to pass only signals of the predetermined frequency. The bypass circuit 5d, which is a high-pass filter, can be implemented by a capacitor element, for example.

The power supply unit 5e uses the power generated by the solar cell module included in the first group 6A to generate power to drive the second shutoff device 5A. When DC power is used as power for driving the second shutoff device 5A, the power supply unit 5e is, for example, a regulator circuit.

The second driving unit 5f outputs a drive signal, to the third switching unit 5a and the fourth switching unit 5b, for driving the third switching unit 5a and the fourth switching unit 5b. The second driving unit 5f uses the power supplied from the power supply unit 5e to generate the drive signal and outputs it to the third switching unit 5a and the fourth switching unit 5b.

When it is desired to connect the solar cell module groups to which the second shutoff device 5A is connected to the other device, the second driving unit 5f outputs a drive signal to the third switching unit 5a and the fourth switching unit 5b to close and turn ON the third switching unit 5a and the fourth switching unit 5b.

In contrast, upon receipt of a signal indicating that the second control signal S2 has been received from the second signal receiving unit 5c, the second driving unit 5f stops outputting the drive signal and opens and turns OFF the third switching unit 5a and the fourth switching unit 5b. With the configuration, the third switching unit 5a and the fourth switching unit 5b are able to cut off the solar cell module groups and the other device in response to the second control signal S2. The second driving unit 5f outputs the second state signal including information that the output of the drive signal has been stopped in response to the second control signal S2 to the first shutoff device 4 by power line communication.

On the contrary to the above configuration, the third switching unit 5a and the fourth switching unit 5b may be turned OFF upon receipt of a drive signal from the second driving unit 5f. In this case, the second driving unit 5f outputs a drive signal when receiving a signal indicating that the second control signal S2 has been received from the second signal receiving unit 5c, and turns OFF the third switching unit 5a and the fourth switching unit 5b. When not receiving the signal indicating that the second control signal S2 has been received, the second driving unit 5f stops outputting the drive signal to turn ON the third switching unit 5a and the fourth switching unit 5b.

The second driving unit 5f is, for example, a signal generating circuit configured to, when receiving a signal from the second signal receiving unit 5c, generate a signal for driving the third switching unit 5a and the fourth switching unit 5b, using the power supplied from the power supply unit 5e.

The second control signal S2 is output, after the first shutoff device 4 receives the first control signal S1 and cuts off the string 2 and the inverter 3. Accordingly, the shutoff of the electric paths by the second shutoff device 5A are performed after the string 2 and the inverter 3 are cut off.

The bypass device 5g is connected in parallel with the first group 6A to which the second shutoff device 5A is connected. The bypass device 5g forms an electric path bypassing the solar cell module groups to which the second shutoff device 5A is connected. As shown in FIG. 3, the bypass device 5g is a diode having an anode connected to the cathode side terminal of the first group 6A and a cathode connected to the anode side terminal of the first group 6A.

When an abnormality such as a sudden power drop or unusual heat generation occurs at the first group 6A to which the second shutoff device 5A is connected and the first group 6A cannot output sufficient power, the bypass device 5g forms an electric path that "bypasses" the defective first group 6A so as to transfer the power generated by another solar cell module group. Specifically, when an abnormality occurs in the first group 6A, the bypass device 5g of the second shutoff device 5A forms a path to transfer the power, which is generated by the second group 6B to the eighth group 6H, from the second group 6B to the inverter 3 (the first shutoff device 4).

When the first group 6A becomes unable to output sufficient power, the bypass device 5g, which is a diode, is able to instantly form an electric path that bypasses the defective first group 6A based on its electrical characteristics without an external signal command.

Figure 4:
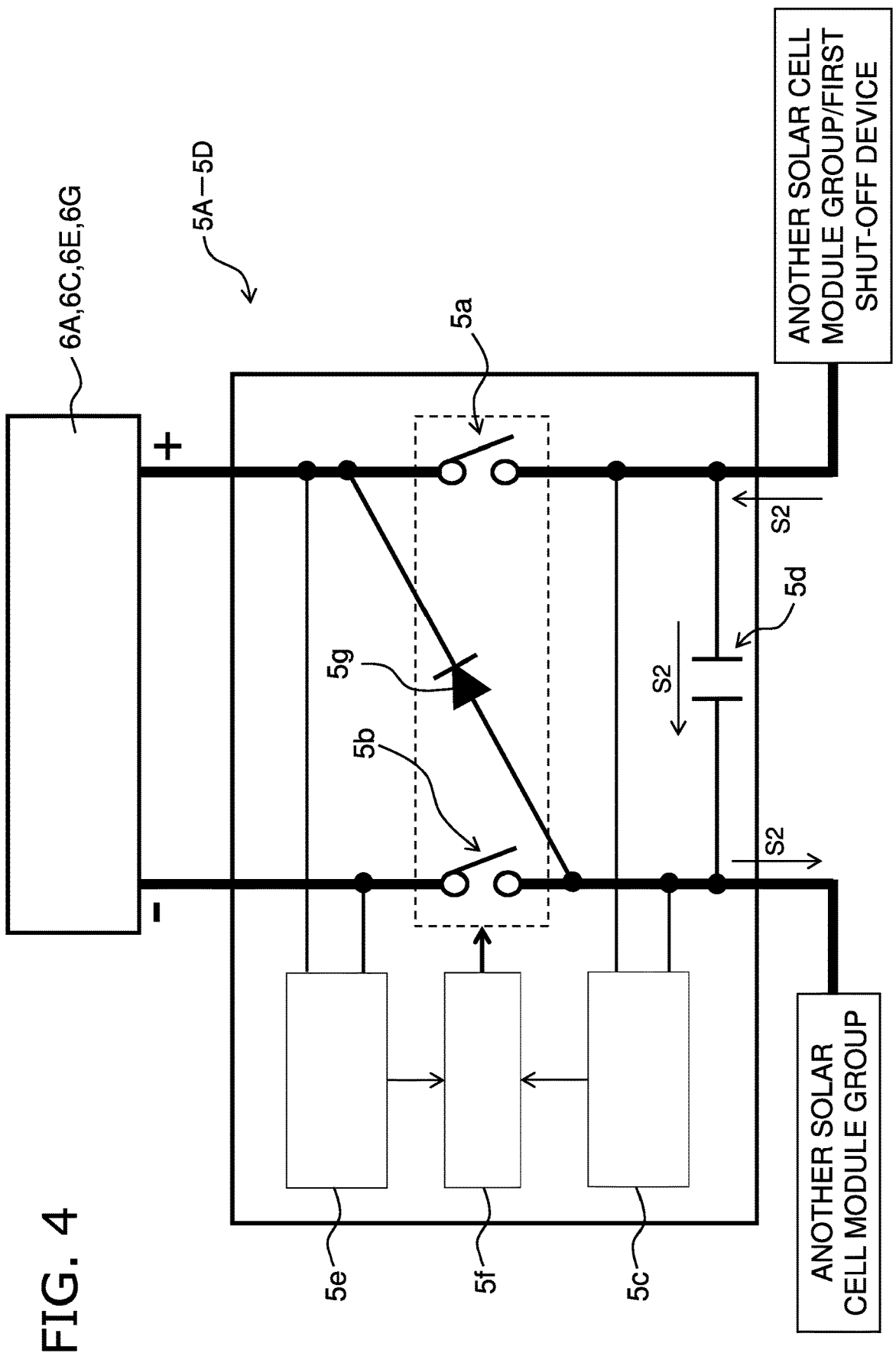
FIG. 4 is a diagram showing another example of connection of a bypass device in a second shutoff device.

It should be noted that the two terminals of the bypass device 5g can be connected to any point as desired as long as the first group 6A to which the second shutoff device 5A is connected is bypassed and also at least one of the terminals of the bypass device 5g is connected to the first group 6A without connection to the third switching unit 5a or the fourth switching unit 5b. For example, as shown in FIG. 4, a configuration is possible in which the anode of the bypass device 5g is connected to the electric path connecting the anode side terminal of the second group 6B and the fourth switching unit 5b and the cathode of the bypass device 5g is connected to the electric path connecting the anode side of the first group and the third switching unit 5a. FIG. 4 is a diagram showing another example of connection of the bypass device 5g in the second shutoff device 5A.

The first shutoff device 4 monitors the second shutoff devices 5A to 5D based on the second state signals output from the second shutoff devices 5A to 5D. The first shutoff device 4 outputs an abnormal signal to the inverter 3 when determining that the second shutoff devices 5A to 5D are abnormal depending on the second state signals output from the second shutoff devices 5A to 5D. The first shutoff device 4 determines that the second shutoff devices 5A to 5D are abnormal when, for example, the second state signals from the second shutoff devices 5A to 5D in response to the second control signal S2 cannot be received. When the inverter 3 receives the abnormal signal from the first shutoff device 4, the inverter 3 notifies that the second shutoff devices 5A to 5D are abnormal via a display unit 10 connected to the inverter 3.

Next, an example of the operations of the first shutoff device 4 and the second shutoff devices 5A to 5D will be described with reference to FIGS. 5 and 6. FIG. 5 is a diagram showing the state of the first shutoff device 4 in each operation mode. FIG. 6 shows the state of the second shutoff devices 5A to 5D in each operation mode. The solar power generation system 1 has three operation modes: a start mode, an active mode, and a safety mode. The safety mode includes a normal shutoff mode and an emergency safety shutoff mode.

The start mode is a mode that turns effective when sunlight starts to hit the solar cell modules 6. At this time, the solar cell modules 6 receive sunlight to generate power. In the start mode, the inverter 3 outputs no first control signal S1 (the first control signal "NONE"), and thereby the first driving unit 4d outputs a drive signal to the first switching unit 4a and the second switching unit 4b in the first shutoff device 4. As a result, the first switching unit 4a and the second switching unit 4b are turned ON (the relay operation mode "ON"), and the string 2 and the inverter 3 are connected. Since no first control signal S1 is output, the first signal sending unit 4e outputs no second control signal S2.

In the second shutoff devices 5A to 5D, the power supply unit 5e uses the power generated in the solar cell module groups to generate power to drive the second shutoff devices 5A to 5D. Also, since the first shutoff device 4 outputs no second control signal S2 (the second control signal "NONE"), the second driving unit 5f uses the power generated by the power supply unit 5e to generate a drive signal and outputs it to the third switching unit 5a and the fourth switching unit 5b. As a result, the third switching unit 5a and the fourth switching unit 5b are turned ON (the relay operation mode "ON"), and the solar cell module groups connected to the second shutoff devices 5A to 5D are connected to the other device.

As described above, the power generated in the string 2 is supplied to the inverter 3 via the first shutoff device 4 in the start mode. The DC power supplied from the string 2 is converted into AC power by the inverter 3 and supplied to the power system 7.

The active mode is a state in which the solar cell modules 6 receive sunlight during the day to generate power, and is substantially the same as the start mode. Specifically, in the active mode, no first control signal S1 is output (the first control signal "NONE"), and the first switching unit 4a and the second switching unit 4b of the first shutoff device 4 are in the ON state (the relay operation mode "ON"). In addition, no second control signal S2 is output (the second control signal "NONE"), and the third switching unit 5a and the fourth switching unit 5b of the second shutoff devices 5A to 5D are in the ON state. As a result, the power generated in the string 2 is supplied to the inverter 3 via the first shutoff device 4. The DC power supplied from the string 2 is converted into AC power by the inverter 3 and supplied to the power system 7.

The normal shutoff mode is a mode when the solar cell modules 6 are not exposed to sunlight at night or due to the influence of bad weather such as rain. Accordingly, in the normal shutoff mode, the solar cell modules 6 do not generate power. In the normal shutoff mode, the inverter 3 outputs the first control signal S1 (the first control signal "PRESENT"). Thus, the first switching unit 4a and the second switching unit 4b of the first shutoff device 4 are in the OFF state (the relay operation mode "OFF").

In the second shutoff devices 5A to 5D, the second control signal S2 is output (the second control signal "PRESENT"), and the third switching unit 5a and the fourth switching unit 5b are in the OFF state (the relay operation mode "OFF"). It should be noted that, in the normal shutoff mode, the second shutoff devices 5A to 5D are not supplied with the power from the solar cell module groups, and thereby no driving signal cannot be generated to be output from the second driving unit 5f to the third switching unit 5a and the fourth switching unit 5b.

In the normal shutoff mode, when the power generation by the solar cell modules 6 is unstable due to unstable weather or the like, no first control signal S1 is output (the first control signal "NONE"), and the first switching unit 4a and the second switching unit 4b of the first shutoff device 4 are in the ON state (the relay operation mode "ON"). In contrast, in the second shutoff devices 5A to 5D, no second control signal S2 is output (the second control signal "NONE"), and the third switching unit 5a and the fourth switching unit 5b are in the ON/OFF state (the relay operation mode "ON/OFF") according to the power supplied from the solar cell module groups connected to the second shutoff devices 5A to 5D.

With the configuration described above, in the normal shutoff mode, either the string 2 cannot supply power to the inverter 3 or the power supply to the inverter 3 is cut off frequently.

The emergency safety shutoff mode is a mode in which the power supply from the string 2 to the inverter 3 is cut off during the start mode or the active mode. The emergency safety shutoff mode starts when the operation switch 8 is operated in the start mode or the active mode.

Specifically, with an operation of the operation switch 8, the first control signal generating unit 3d of the inverter 3 sends the first control signal S1 to the first shutoff device 4 by power line communication (the first control signal "PRESENT"). Thus, in the present embodiment, the first control signal S1 is output only at the start of the emergency safety shutdown mode.

When the first signal receiving unit 4c receives the first control signal S1, the first driving unit 4d stops outputting drive power to the first switching unit 4a and the second switching unit 4b. As a result, the first switching unit 4a and the second switching unit 4b are turned OFF, and the string 2 and the inverter 3 are cut off (the relay operation mode "OFF"). At the timing when the first switching unit 4a and the second switching unit 4b are turned OFF, the first signal sending unit 4e outputs the second control signal S2 to the string 2 by power line communication (the second control signal is "PRESENT").

When the second signal receiving unit 5c of the second shutoff devices 5A to 5D receives the second control signal S2, the second driving unit 5f stops outputting driving power to the third switching unit 5a and the fourth switching unit 5b. As a result, the third switching unit 5a and the fourth switching unit 5b are turned OFF, and the solar cell module groups and the other device connected to the second shutoff devices 5A-5B are cut off (the relay operation mode "OFF"). That is, the voltages output from all the solar cell modules 6 included in the string 2 are cut off. When the second driving unit 5f receives the second control signal S2 and stops outputting the driving signals to drive the third switching unit 5a and the fourth switching unit 5b, the second driving unit 5f outputs the second state signal including information that the output of the drive signal to the third switching unit 5a and the fourth switching unit 5b has been stopped to the first shutoff device 4. The first shutoff device 4 determines that the second shutoff devices 5A to 5D are abnormal when the second state signals from the second shutoff devices 5A to 5D in response to the second control signal S2 cannot be received.

As described above, in the emergency safety shutoff mode, the first shutoff device 4 is able to shutoff the string 2 and the inverter 3, and the second shutoff devices 5A to 5D are able to cut off the solar cell module groups in the string 2 by group. Specifically, the second shutoff device 5A cuts off the connection between the first group 6A and the second group 6B. The second shutoff device 5B cuts off the connection between the second group 6B and the third group 6C and the connection between the third group 6C and the fourth group 6D. The second shutoff device 5C cuts off the connection between the fourth group 6D and the fifth group 6E and the connection between the fifth group 6E and the sixth group 6F. The second shutoff device 5D cuts off the connection between the sixth group 6F and the seventh group 6G and the connection between the seventh group 6G and the eighth group 6H.

With the configuration, in the solar power generation system 1, the installation cost of the shutoff devices can be reduced compared with the case where a shutoff device is installed for each solar cell module 6. In addition, in the emergency safety shutoff mode, not only the string 2 is cut off for each solar cell module group, but also the connection between the string 2 and the inverter 3 is cut off, and thereby a solar power generation system with higher safety can be provided.

In the solar power generation system1, the first shutoff device 4 includes the first switching unit 4a connected to the anode side terminal of the string 2 and the anode side terminal of the inverter 3, and the second switching unit 4b connected to the cathode side terminal of the string 2 and the cathode side terminal of the inverter 3, so that the first switching unit 4a and the second switching unit 4b are turned OFF in response to a first control signal S1 from the inverter 3. That is, the first shutoff device 4 is able to cut off both of the power line connecting the anode side terminal of the string 2 and the anode side terminal of the inverter 3 and the power line connecting the cathode side terminal of the string 2 and the cathode side terminal of the inverter 3, in response to the first control signal S1. In this way, the first shutoff device 4 is configured to cut off both of the two power lines connecting the string 2 and the inverter 3, leading to reliable electrical cutoff of the string 2 and the inverter 3. As a result, it is possible to improve the safety of the solar power generation system 1 in an emergency.

The second shutoff devices 5A to 5D include the third switching unit 5a connected to an electric path connecting the anode side terminal of a solar cell module group and either another solar cell module group 6 or the inverter 3, and the fourth switching unit 5b connected to an electric path connecting the cathode side terminal of the solar cell module group and either another solar cell module group 6 or the inverter 3. With the configuration, in the second shutoff devices 5A to 5D, both of the electric path connecting the anode side terminal of a solar cell module group and another solar cell module group or inverter 3 and the electric path connecting the cathode side terminal of the solar cell module group and either another solar cell module group 6 or the inverter 3 are cut off. As a result, it is possible to improve the safety of the solar power generation system 1 in an emergency.

Since each of the second shutoff devices 5A to 5D outputs the second state signal to the first shutoff device in response to the second control signal S2 from the first shutoff device 4, the first shutoff device 4 can detect that the second shutoff devices 5A to 5D are operating normally when the operation switch 8 is operated. As a result, a further highly safe solar power generation system 1 can be provided.

The second shutoff devices 5A to 5D include the bypass device 5g that is connected in parallel with a solar cell module group to form an electric path bypassing the solar cell module. With the configuration, when an abnormality occurs in the solar cell module group, power generated by the other solar cell modules bypasses the bypass device to be supplied to the inverter 3.

The first shutoff device 4 is driven by the power supplied from a commercial power supply 9. Thus, the first shutoff device 4 is able to operate regardless of whether power is supplied from the string 2 or not. As a result, the string 2 and the inverter 3 can be reliably cut off in an emergency, and thereby it is possible to improve the safety of the solar power generation system 1 in an emergency.

The second shutoff devices 5A to 5D are driven by the power generated by the solar cell modules 6. As such, the power generated by the solar cell modules 6 is used effectively to drive the second shutoff devices 5A to 5D.

The inverter 3 outputs the first control signal S1 to the first shutoff device 4 by power line communication. As such, no separate line is necessary for the communication between the inverter 3 and the first shutoff device 4.

Upon receipt of the first control signal S1 from the inverter 3, the first shutoff device 4 may output the second control signal S2 to the second shutoff devices 5A to 5D by power line communication. With the operation, no separate line is necessary for the communication between the first shutoff device 4 and the second shutoff devices 5A to 5D.

One embodiment of the present invention has been described above, but the present invention is not limited to the above embodiment, and various modifications can be made without departing from the gist of the invention.

The group division of solar cell module groups in string 2 and the number of solar cell modules 6 included in each group can be determined as needed, for example, based on the open-circuit voltage to be used for cutting off the string 2 during the emergency safety shutoff mode. For example, in the emergency safety shutoff mode, the open circuit voltage of string 2 is preferably divided to 165 V or less. When one solar cell module 6 has an open-circuit voltage of 50 V, it is preferable to cut off the strings 2 into groups each including three solar cell modules 6.

Figure 7:
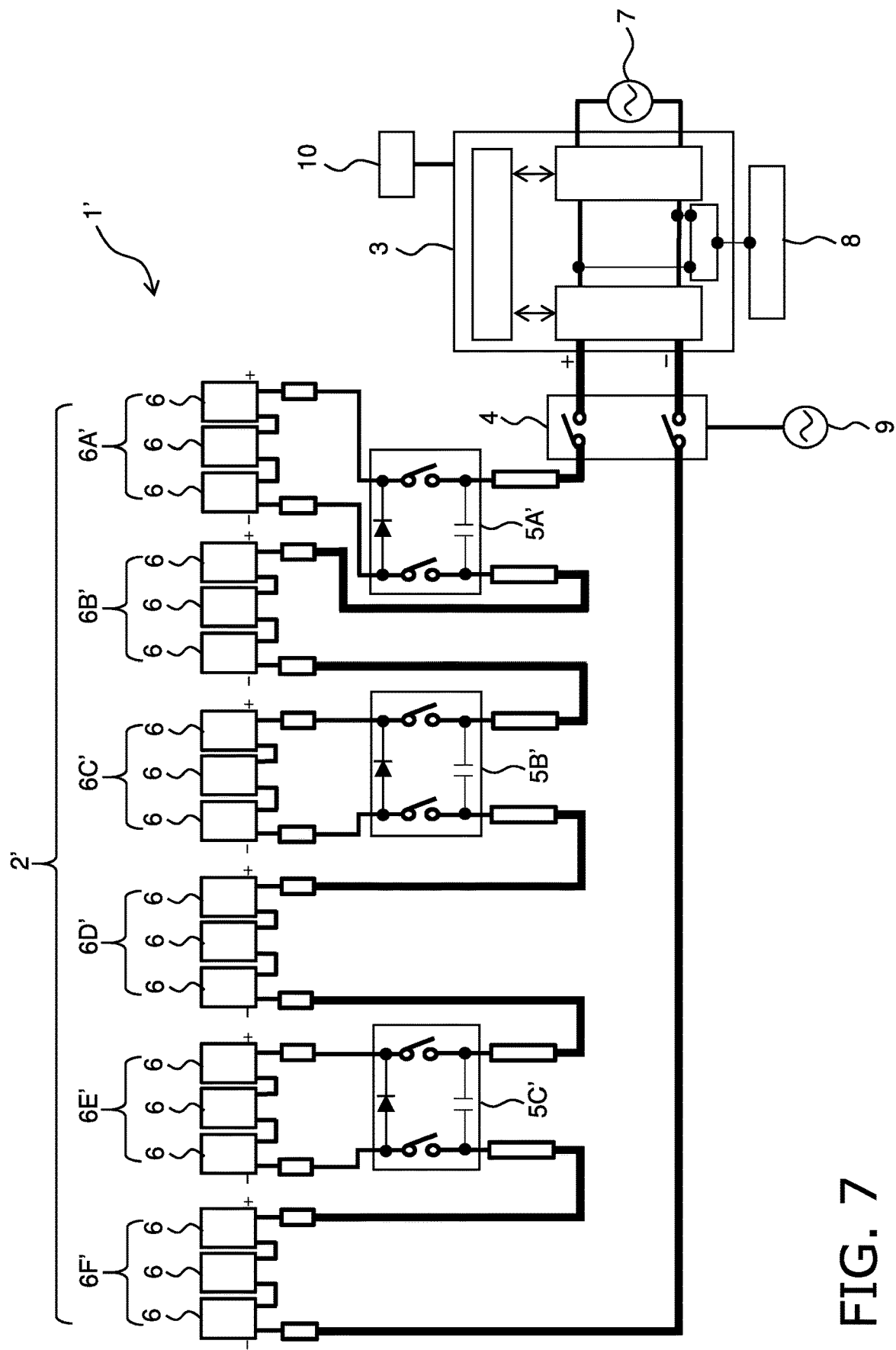
FIG. 7 is a diagram showing another configuration of solar cell module groups in a string.

For example, in the solar power generation system 1' shown in FIG. 7, the string 2' includes 18 solar cell modules 6 connected in series, and includes six solar cell module groups 6A' to 6F'. Each of the solar cell module groups 6A' to 6F' includes three serial solar cell modules 6. Further, the solar cell module groups 6A', 6C, 6E' are connected to second shutoff devices 5A', 5B', 5C, respectively. FIG. 7 is a diagram showing another configuration of solar cell module groups in a string.

Figure 8:
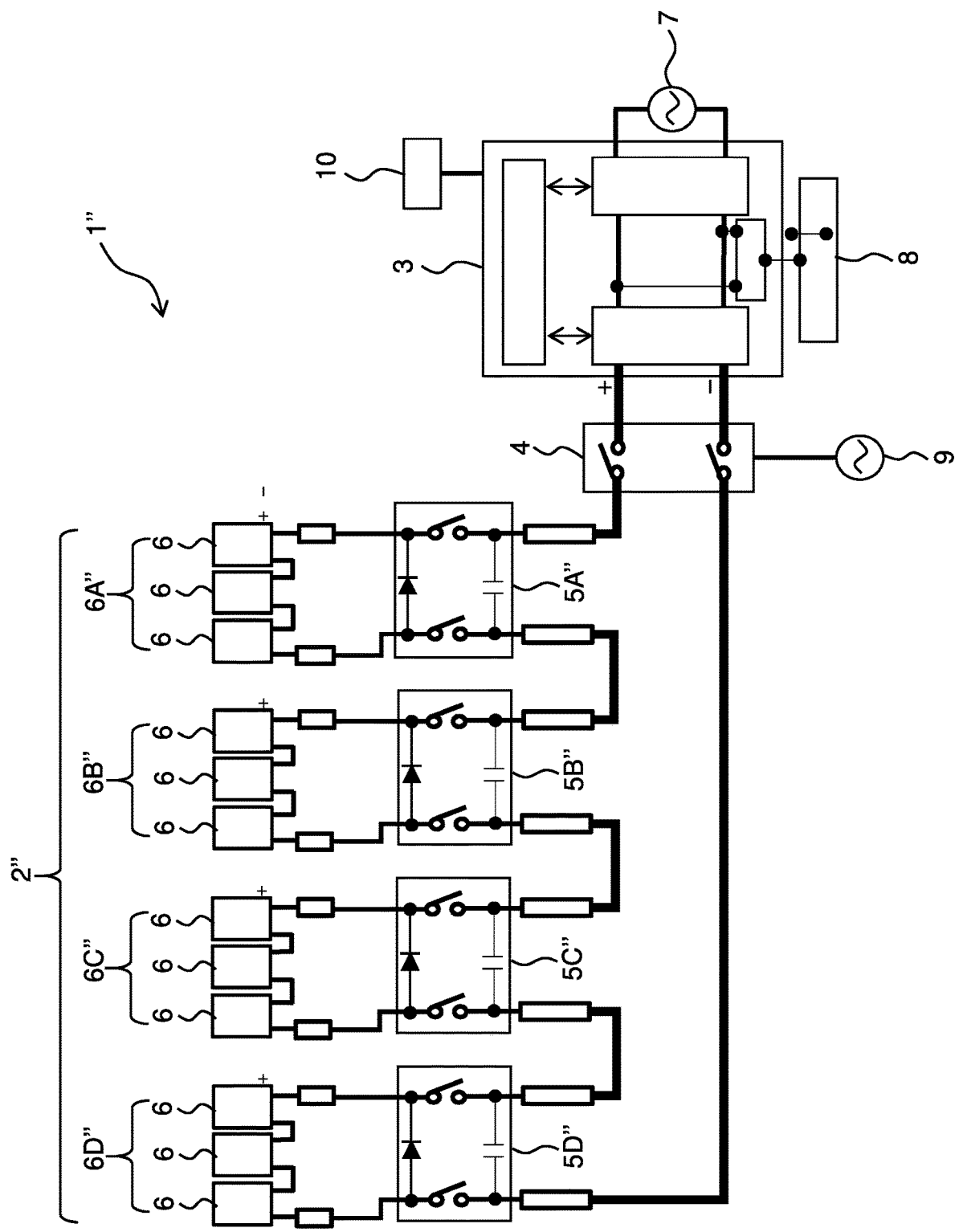
FIG. 8 is a diagram showing another configuration of solar cell module groups in a string.

In the solar power generation system 1" shown in FIG. 8, for example, the string 2" includes 12 solar cell modules 6 connected in series, and includes four solar cell module groups 6A" to 6D". Each of the solar cell module group 6A" to 6D" includes three serial solar cell modules 6. Furthermore, the solar cell module groups 6A" to 6D" are connected to second shutoff devices 5A" to 5D", respectively. FIG. 8 is a diagram showing another configuration of solar cell module groups in a string.

It should be noted that the solar power generation systems 1' and 1" differ from the above solar power generation system 1 only in the configuration of the solar cell module groups in the strings 2' and 2". Other configurations of the solar power generation systems 1' and 1" are the same as those of the solar power generation system 1.

The start mode or the active mode may be switched to the emergency safety shutoff mode when an abnormality is detected in the output from the solar cell modules 6 in the string 2. In this case, for example, the solar power generation system 1 may include a sensor that is configured to detect an output of the solar cell module 6, so that when an abnormality is detected from the output of the solar cell module 6 by the sensor, the first control signal generating unit 3d of the inverter 3 outputs the first control signal S1 to perform the switching to the emergency safety shutoff mode. Alternatively, for example, the inverter 3 may be connected to a fire sensor or a fire alarm, so that when the inverter 3 receives a signal from the fire sensor or the fire alarm, the first control signal generating unit 3d outputs the first control signal S1 to perform the switching to the emergency safety shutoff mode.

The first control signal S1 and/or the second control signal S2 can be sent and received by methods other than power line communication. For example, the first control signal S1 and/or the second control signal S2 may be sent and received by wireless communication. Alternatively, the first control signal S1 may be sent and received by power line communication, while the second control signal S2 may be sent and received by wireless communication. For sending and receiving the second control signal S2 by wireless communication, no bypass circuit 5d is necessary in the second shutoff device. Each of the second shutoff devices 5A to 5D may output the second state signal to the first shutoff device 4 by wireless communication. Each of the second shutoff devices 5A to 5D may be connected to the first shutoff device 4 in a two-way communicable manner by wireless communication. The first shutoff device 4 may output the abnormal signal to the inverter 3 by wireless communication. The first shutoff device 4 may be configured to output the abnormal signal to a user's mobile terminal by wireless communication.

The second state signals output from the second shutoff devices 5A to 5D may include at least one of information about the voltage of the second shutoff devices 5A to 5D, current of the second shutoff devices 5A to 5D, or an opened or closed state of each the fourth switching unit 5b. The first shutoff device 4 may determine that the second shutoff devices 5A to 5D are abnormal based on the information about the opened or closed state of each the fourth switching unit 5b. When each the fourth switching unit 5b is composed of a mechanical relay, the first shutoff device 4 may determine the second shutoff devices 5A to 5D are abnormal by monitoring the voltage between the contacts of each the fourth switching unit 5b based on the second state signals output from the second shutoff devices 5A to 5D to detect welding of each the fourth switching unit 5b. When the second state signals output from the second shutoff devices 5A to 5D include the information about the opened or closed state of each the fourth switching unit 5b, the second state signals output from the second shutoff devices 5A to 5D may further include information about the opened or closed state of each the third switching unit 5a. The second state signals output from the second shutoff devices 5A to 5D may include information indicating that the second shutoff devices 5A to 5D are abnormal. That is, the second shutoff devices 5A to 5D may be configured to monitor their own voltage and the like and detect abnormalities in the second shutoff devices 5A to 5D themselves.

In the above embodiment, the second shutoff devices 5A to 5D are configured to output the second state signals to the first shutoff device 4 in response to the second control signal S2 from the first shutoff device 4. However, the second shutoff devices 5A to 5D may output the second state signals to the first shutoff device 4 periodically or constantly in the active mode when the second state signals output from the second shutoff devices 5A to 5D include at least one of information about the voltage of the second shutoff devices 5A to 5D, current of the second shutoff devices 5A to 5D, or the opened or closed state of each the fourth switching unit 5b.

In the above embodiment, the second shutoff devices 5A to 5D are configured to output the second state signals to the first shutoff device 4. However, the second shutoff devices 5A to 5D may output the second state signals to the inverter by power line communication or wireless communication. In this case, inverter 3 may determine an abnormality in the second shutoff devices 5A to 5D depending on the second state signals output from the second shutoff devices 5A to 5D and notify that the second shutoff devices 5A to 5D are abnormal via the display unit 10.

The first shutoff device 4 may output a first state signal to the inverter 3 via power line communication or wireless communication. The inverter 3 may monitor the first shutoff device 4 based on the first state signal output from the first shutoff device 4. When the inverter 3 determines that the first shutoff device 4 is abnormal depending on the first state signal output from the first shutoff device 4, the inverter 3 may output an abnormal signal to the display unit 10 or the user's mobile terminal to report that the first shutoff device 4 is abnormal. The first state signal output from the first shutoff device 4 may be the same information as the second state signals output from the second shutoff devices 5A to 5D. The first state signal output from the first shutoff device 4 may be, for example, feedback to the inverter in response to the first shutoff device 4 outputting the command signal to the first switching unit 4a or the second switching unit 4b in response to the first control signal, may include at least one of information about the voltage of the first shutoff device 4, current of the first shutoff device 4, or an opened or closed state of the first switching unit 4a or the second switching unit 4b, or may include information indicating that the first shutoff device 4 is abnormal.

The first control signal S1 and/or the second control signal S2 may represent different types of information. That is, switching to the emergency safety shutdown mode can be determined not only by the presence or absence of the first control signal S1 and the second control signal S2, but also by a certain type of information represented by the first control signal S1 and/or the second control signal S2.

For example, the first control signal S1 and the second control signal S2 may represent two types of values by binary numbers (referred to as a first value and a second value). In this case, for example, when the first control signal S1 and the second control signal S2 exhibit the first value, switching to the emergency safety shutoff mode may be determined to be performed (the string 2 and the inverter 3 are cut off, and/or the connections between the solar cell module groups in the string 2 are cut off). When the first control signal S1 and the second control signal S2 exhibit the second value, the switching may be determined not to be performed (the string 2 and inverter 3 are remained connected, and/or the solar cell module groups in the string 2 are remained connected).

The first control signal S1 and the second control signal S2 may be output at any time in modes other than the emergency safety shutoff mode, and the output of the first control signal S1 and the second control signal S2 may be stopped in the emergency safety shutoff mode. In this case, the first shutoff device and the second shutoff devices turn ON the switching units when receiving the first control signal S1 and the second control signal S2, and turn OFF the switching units while not receiving the first control signal S1 and the second control signal S2.

REFERENCE NUMERALS 1, 1', 1" Solar power generation system
2, 2', 2" String
3 Inverter
3a DC/DC converter
3b DC/AC inverter
3c Control unit
3d First control signal generating unit
4 First shutoff device
4a First switching unit
4b Second switching unit
4c First signal receiving unit
4d First driving unit
4e First signal sending unit
5A to 5D Second shutoff device
5A' to 5C' Second shutoff device
5A" to 5D" Second shutoff device
5a Third switching unit
5b Fourth switching unit
5c Second signal receiving unit
5s Bypass circuit
5e Power supply unit
5f Second driving unit
5g Bypass device
6 Solar cell modules
6A to 6H Solar cell module group
6A' to 6D' Solar cell module group
6A" to 6S" Solar cell module group
7 Power system
8 Operation switch
9 Commercial power supply
S1 First control signal
S2 Second control signal

The invention claimed is:
1. A solar power generation system comprising:
a string including a plurality of solar cell modules connected in series;

an inverter connected to the string and configured to convert DC power output from the string to AC power;

a first shutoff device including a first switching unit and a second switching unit, the first switching unit being located in an anode-side circuit branch extending between an anode side terminal of the string and an anode side terminal of the inverter to open and close the anode-side circuit branch, the second switching unit being located in a cathode-side circuit branch extending between a cathode side terminal of the string and a cathode side terminal of the inverter to open and close the anode-side circuit branch, the first shutoff device configured to turn OFF the first switching unit and the second switching unit in response to a first control signal from the inverter; and a second shutoff device connected to an electric path connecting a solar cell module group and either another solar cell module or the inverter, the solar cell module group including one or a plurality of solar cell modules connected in series in the string, the second shutoff device configured to cut off the solar cell module group and either the another solar cell module or the inverter in response to a second, direct control signal from the first shutoff device, the second shutoff device further configured to output a second state signal to the inverter or the first shutoff device in response to the second, direct control signal from the first shutoff device.

2. The solar power generation system according to claim 1, wherein when the inverter or the first shutoff device determines that the second shutoff device is abnormal depending on the second state signal, the inverter or the first shutoff device outputs an abnormal signal.

3. The solar power generation system according to claim 1, wherein the second shutoff device outputs the second state signal to the inverter or the first shutoff device by power line communication.

4. The solar power generation system according to claim 1, wherein the second shutoff device outputs the second state signal to the inverter or the first shutoff device by wireless communication.

5. The solar power generation system according to claim 1, wherein the second shutoff device includes an open-close unit configured to open and close a connection between the solar cell module group and the another solar cell module, and
the second state signal includes information about an opened or closed state of the open-close unit.

6. The solar power generation system according to claim 1, wherein the inverter is configured to monitor the first shutoff device based on a first state signal output from the first shutoff device.

7. The solar power generation system according to claim 6, wherein when the inverter determines that the first shutoff device is abnormal depending on the first state signal, the inverter outputs an abnormal signal.

8. The solar power generation system according to claim 1, wherein the second shutoff device includes a third switching unit and a fourth switching unit, the third switching unit connected to an electric path connecting an anode side terminal of the solar cell module group and either the another solar cell module or the inverter, the fourth switching unit connected to an electric path connecting a cathode side terminal of the solar cell module group and either the another solar cell module or the inverter.

9. The solar power generation system according to claim 1, wherein the second shutoff device includes a bypass device connected in parallel with the solar cell module group and configured to form an electric path bypassing the solar cell module group.

10. The solar power generation system according to claim 9, wherein the bypass device is a diode having an anode connected to the cathode side terminal of the solar cell module group and a cathode connected to the anode side terminal of the solar cell module group.

11. The solar power generation system according to claim 1, wherein the first shutoff device is driven by power supplied from a commercial power supply.

12. The solar power generation system according to claim 1, wherein the second shutoff device is driven by power generated by at least one of the plurality of solar cell modules.

13. The solar power generation system according to claim 1, wherein the inverter outputs the first control signal to the first shutoff device by power line communication.

14. The solar power generation system according to claim 1, wherein the inverter outputs the first control signal to the first shutoff device by wireless communication.

15. The solar power generation system according to claim 1, wherein the first shutoff device outputs the second, direct control signal to the second shutoff device by power line communication upon receipt of the first control signal from the inverter.

16. The solar power generation system according to claim 1, wherein the first shutoff device outputs the second, direct control signal to the second shutoff device by wireless communication upon receipt of the first control signal from the inverter.

* * * * *